Dec. 16, 1930.  H. L. F. TREBERT  1,785,057
BRAKE MECHANISM
Filed Jan. 13, 1926  2 Sheets-Sheet 2
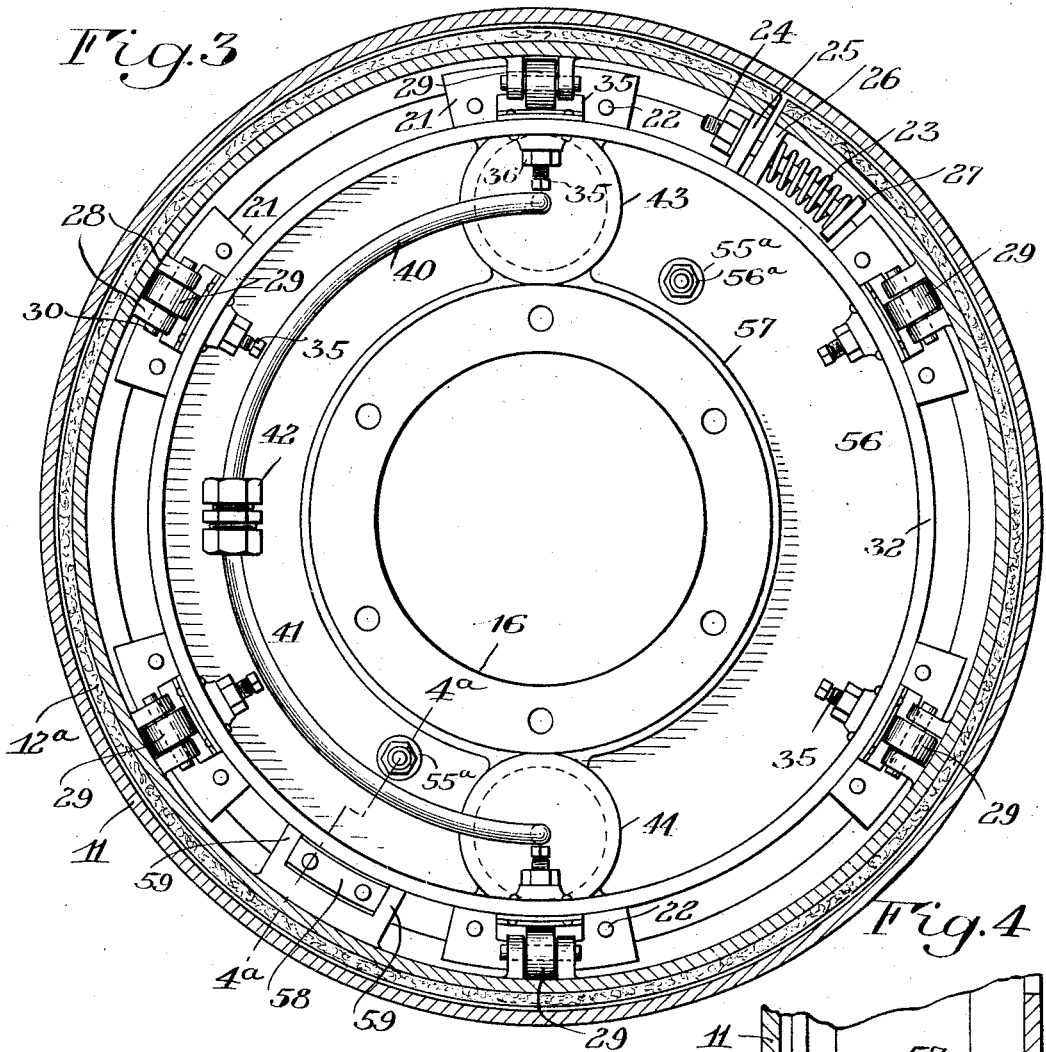
INVENTOR
Henry L. F. Trebert
BY
his ATTORNEYS Patented Dec. 16, 1930

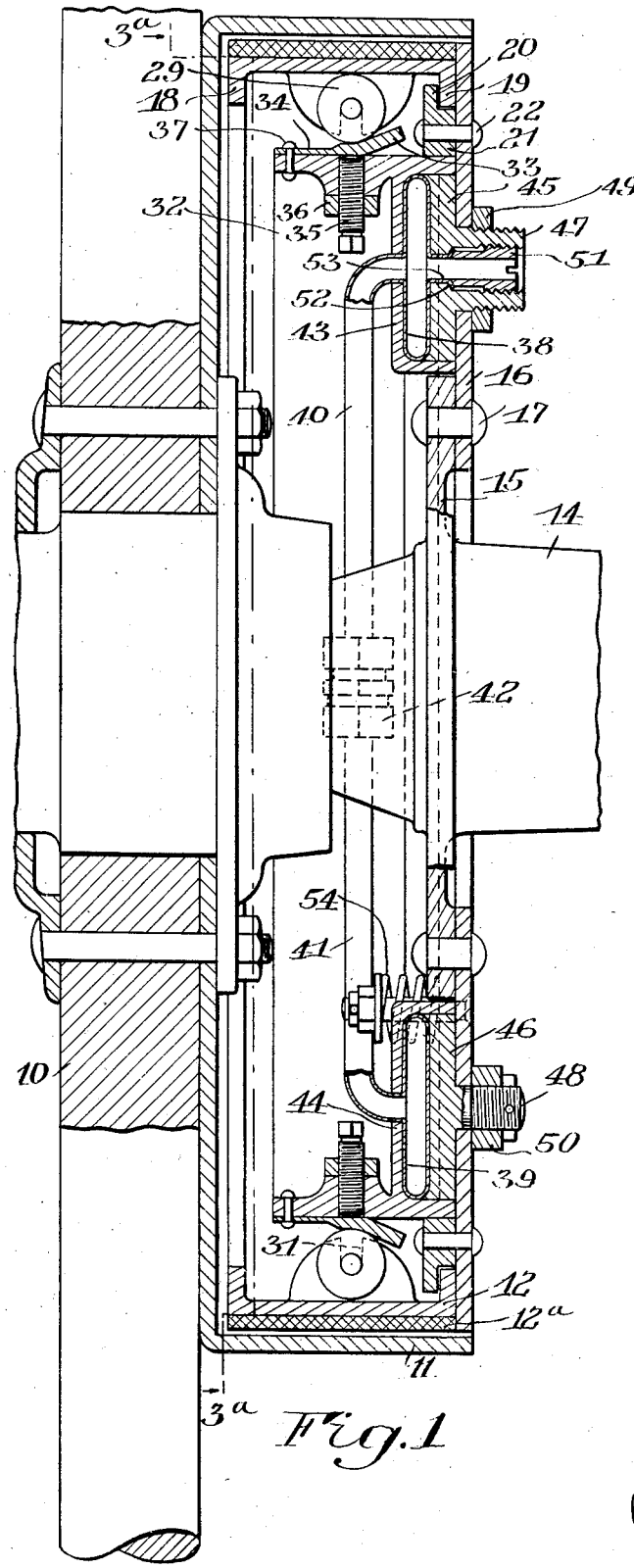
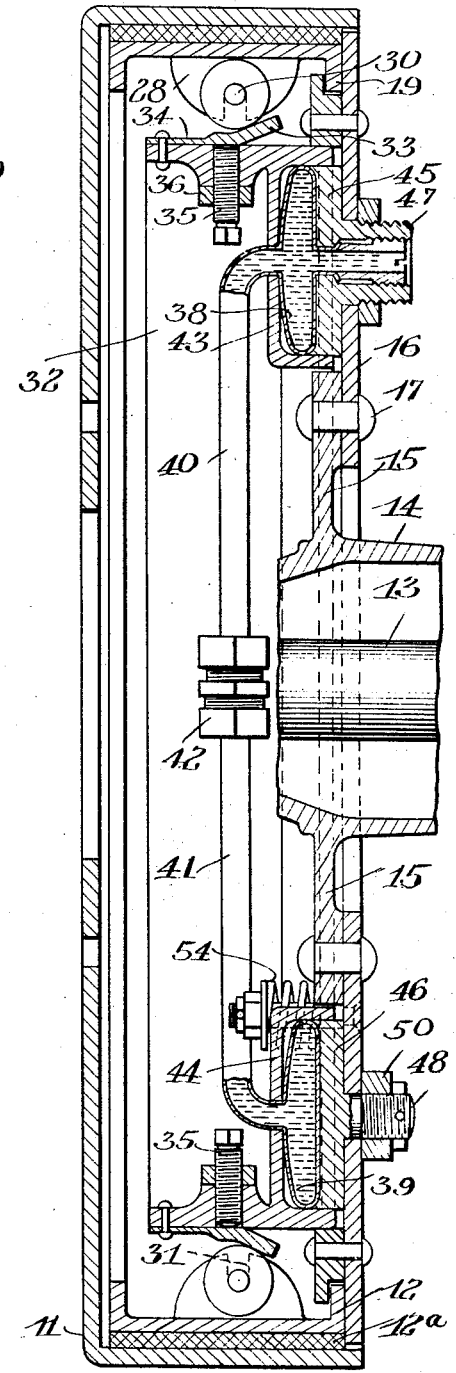

1,785,057

UNITED STATES PATENT OFFICE

HENRY L. F. TREBERT, OF CANANDAIGUA, NEW YORK

BRAKE MECHANISM

Application filed January 13, 1926. Serial No. 80,865.

The present invention relates to brake mechanisms, and, more particularly, to an improved hydraulic brake, one object of the invention being to provide a brake which will operate smoothly and uniformly in its application and thus afford better braking results, the improvements being adapted to more evenly distribute the strains on the driven parts through a gradual application of the braking forces and by better or more complete contact between the braking element and the driven element than has heretofore been obtained.

A further object of the invention is to provide an improved actuating device for moving the brake band or other braking element into engagement with the brake drum or other driven element and, further, to provide improved operating means for the actuating device, preferably of the hydraulic type.

A still further object is to provide a brake which can be economically constructed and which will be highly efficient in operation, convenient to apply and economical to maintain in service.

To these and other ends the invention resides in certain improvements and combinations of parts, all as will be hereinafter more fully described, the novel features being pointed out in the claims at the end of the specification.

In the drawings:—

Figure 1 is a sectional elevation illustrating one embodiment of the invention with the brake shown in release position;

Figure 2 is a similar view with certain parts omitted and with the brake shown applied;

Figure 3 is a sectional elevation taken on line 3a—3a of Figure 1;

Figure 4 is a fragmentary section taken on line 4a—4a of Figure 3, and

Figure 5 is a view looking at the upper portion of the inner face of the brake drum and showing the connection for the fluid supply conduit.

Similar reference numerals throughout the several views indicate the same parts.

Referring to the drawings, 10 represents a power driven member, such as a motor vehicle wheel, to which is secured in any desired manner a drum 11 or other suitable member to which the braking force is to be applied, while 12—12a represents the braking element, preferably a brake band of a well known type. The wheels or power driven parts with which the brakes are adapted to cooperate may be the front or rear wheels of an automobile, or those of any other motor or power driven vehicle or machine. In the present illustration, the brake is shown in connection with one of the driving wheels of an automobile having the usual form of axle including the driving spindle 13 and housing 14 therefor.

A support for the brake is carried by the housing including a flange 15 and brake drum closure 16 secured thereto, preferably by bolts or rivets 17 as shown in Figures 1 and 2. The brake band section 12 is preferably provided with inwardly extending flanges 18 and 19, the latter of which is secured between the closure plate 16 and the flanges 20 of a series of keepers 21 connected with the support 16 by rivets 22, as shown in Figure 1. This construction prevents displacement of the brake band longitudinally of the axle or driving shaft. The band is of the split type and its ends are urged towards each other by any suitable means, such as a spring 23 carried by a bolt 24 extending loosely through the oppositely spaced and inwardly extending lugs 25 and 26 of the band, the latter forming a seat for one end of the spring which is seated at its opposite end upon the head 27 of the bolt, as shown in Figure 3. The spring serves as a releasing means for the band and normally holds it in release position by forcing its ends one toward another. The band is provided with a plurality of sets of inwardly extending lugs 28 between each set of which is disposed a roller 29 having a pivot pin 30 rotatable in the bearings, the latter being slotted to receive the pin as indicated at 31 in Figure 2.

An actuating device for expanding the band into engagement with the drum is preferably provided in the form of an annular or ring-shaped member 32, the inner end of which is supported and guided by the keepers 21. The annular member 32 is provided on its outer peripheral face with a series of inclined shoes or cams 33 which engage the rollers as shown in Figures 1 and 2. These parts are preferably reduced in thickness at 34 to render them yieldable and therefore adjustable by the action of the adjusting screws 35 which are held in the desired position of adjustment by the lock nuts 36. The shoes or cams 33 are secured upon the annular member 32 preferably by the rivets 37 which are placed adjacent the outer edges of said members to allow for the required adjustment in taking up for the wear of the brake band when it becomes necessary to adjust the latter or when adjusting it at the time the parts are assembled. It will be readily understood that with the brake actuating member 32 mounted for movement longitudinally of the axle any outward movement of the same towards the wheel will serve to effect a radial movement of the rollers and a consequent expanding of the band whereby the latter may be moved into engagement with the drum whenever it is desired to apply the brake. Through the series of cams or rollers provided, the outward pressure on the brake band is uniformly distributed since all parts of the band are preferably made to engage the brake drum at the same time. With all of the cams adjusted to the same extent practically the entire braking surface of the band will contact with the drum under even pressure thereby avoiding uneven wear of the brake lining and at the same time permitting the maximum braking force to be applied quickly without undue strain on the parts.

The means for operating the actuating member 32 to move it longitudinally of the axle may comprise any suitable or preferred form of construction but preferably comprises hydraulic means of a simple and reliable nature embodying a suitable number of fluid pressure operated diaphragms 38 and 39. These are preferably disposed internally of the drum and connected therein by the conduits 40 and 41 and coupling 42, the conduits being disposed in the form of a semi-circular connection as shown in Figure 3 to clear that portion of the wheel bearing or axle housing projecting into the drum. Casings for the diaphragms are provided to support and protect the same and the outer sections of these are indicated at 43 and 44 which are preferably cast integral with the actuating member 32. The sections 43 and 44 constitute pockets for the diaphragms in which are disposed the closely fitting heads 45 and 46 carried by the support or drum closure plate 16, the heads having threaded extensions 47 and 48 projecting through the plate 16 and provided with securing nuts 49 and 50, respectively. The threaded extension 47 is projected beyond the nut 49 to receive a coupling, not shown, for a fluid supply pipe or conduit connected with a suitable supply of fluid under pressure which can be conveniently controlled by the operator of the vehicle through the medium of any well known means. The threaded extension 47 is provided with a hollow screw plug 51 adapted to engage the outwardly flared portion 52 of the extended neck portion 53 of the diaphragm 43, whereby the inner wall of the diaphragm is firmly anchored upon the head 45. The diaphragms are preferably made of steel, but may be constructed of any other material suitable for the purpose. The conduits 40 and 41 are preferably formed integral with the diaphragms but may constitute separate parts, if desired. However, by forming them integral with the diaphragms leakage of fluid is positively prevented. While the diaphragms are preferably of the hollow closed type, as shown, they may be constructed in any other manner desired. By completely enclosing the diaphragms, they are protected from injury and their length of service increased, particularly since they are subjected to but slight movement in operation since very little movement of the actuating member 32 is required to effect application of the brake. The normal position of the diaphragms is shown in Figure 1, while in Figure 2 they are shown slightly separated and in position to effect application of the brake.

While the actuating member 32 is supported and guided in its movement longitudinally of the axle by the keepers 21, it is also guided and supported by the heads 45 and 46 of the diaphragm casings as will be understood.

The return of the actuating member to normal position, as shown in Figure 1, may be effected by any suitable means, but preferably by the springs 54 on the studs 55 which are anchored in the brake drum closure plate 16 as shown in Figure 4, the studs being extended through the vertical wall 56 of the actuating member upon which the inner ends of the springs rest, their outer ends being held by the washers 55a seated upon the nuts 56a as shown in Figure 4. The vertical plate portion 56 is provided adjacent the peripheral edge of the axle housing flange 15 with a laterally extending strengthening flange 57 as shown in Figures 3 and 4.

The brake band is held against displacement circumferentially of the drum by a stop 58 riveted to the brake drum closure plate 16 and disposed between the spaced lugs 59 which project inwardly from the band at a point opposite the ends of the latter as shown in Figure 3.

I claim as my invention:

1. In a brake mechanism, the combination of a wheel and driving spindle, a brake drum connected with the wheel, a housing for the spindle, a brake band movable to engage the drum, a support carried by the housing, an annular actuating device for the band slidable upon the support axially of the spindle and including portions inclined to the axis of the spindle adapted for moving the band into engagement with the drum, and expansible fluid pressure operated means for moving said actuating device.

2. In a brake mechanism, the combination of a wheel and axle, a brake drum connected with the wheel, a support carried by the axle, an expansible brake element within the drum, an actuating device for expanding said brake element movable upon said support longitudinally of the axle, a plurality of fluid pressure actuated devices carried by the support within the drum adapted to operate said actuating device and retracting means for the actuating device.

3. In a brake mechanism, the combination of a wheel and axle, a brake drum connected with the wheel, a closure for the drum carried by the axle, a brake band within the drum adapted for movement into engagement therewith, means on the closure for holding the band against axial movement, an annular member within the drum reciprocably mounted upon said support for movement longitudinally of the axle, means interposed between the annular member and the band for expanding the latter upon movement of the annular member in one direction, and operating means for the annular member.

4. In a brake mechanism, the combination of a wheel and axle, a brake drum connected with the wheel, a support carried by the axle, an annular member mounted within the drum for movement upon the support longitudinally of the axle, a brake band surrounding said annular member, devices interposed between the band and the annular member whereby when the latter is moved in one direction the band is expanded into engagement with the drum, and operating means for the annular member.

5. In a brake mechanism, the combination of a wheel and axle, a brake drum connected with the wheel, a support carried by the axle, an annular member mounted within the drum for movement upon the support longitudinally of the axle, a brake band surrounding said annular member, devices interposed between the band and the annular member whereby when the latter is moved in one direction the band is expanded by said devices into engagement with the drum, fluid pressure actuated means for moving said annular member to effect application of the brake, and releasing means for the annular member.

6. In a brake mechanism, the combination of a wheel and axle, a brake drum connected with the wheel, a support carried by the axle, an annular member mounted within the drum for movement upon the support longitudinally of the axle, a brake band surrounding said annular member, devices interposed between the band and the annular member whereby when the latter is moved in one direction the band is expanded into engagement with the drum, and a plurality of fluid pressure actuated diaphragms operatively associated with said annular member.

7. In a brake mechanism, the combination of a wheel and axle, a brake drum connected with the wheel, a support carried by the axle, an annular member mounted for movement upon the support longitudinally of the axle, a brake band surrounding said annular member, a plurality of cams interposed between the band and the annular member whereby when the latter is moved in one direction the band is expanded into engagement with the drum, means for individually adjusting the cams upon said annular member, and operating means for the annular member.

8. In a brake mechanism, the combination of a wheel and axle, a brake drum connected with the wheel, a support carried by the axle, an annular member mounted for movement within the drum longitudinally of the axle, a brake band surrounding said annular member, means upon the support for holding the band against movement longitudinally of the axle, means between the annular member and the band by which the latter is expanded into engagement with the drum upon movement of the annular member in one direction, and a plurality of fluid pressure actuated diaphragms operatively associated with the annular member.

9. In a brake mechanism, the combination of a wheel and axle, a brake drum connected with the wheel, an expansible brake band within the drum, a support carried by the axle, an annular member mounted within the drum for movement upon the support longitudinally of the axle, and having portions inclined with respect to the axis of the wheel, rollers disposed between said inclined portions and the band, and means for moving said annular member longitudinally of the axle whereby to effect expansion of the band.

10. In a brake mechanism, the combination of a wheel and axle, a brake drum connected with the wheel, a support carried by the axle, a ring secured to the inner face of the support, a brake band within the drum having a portion engaging the ring to prevent displacement of the band longitudinally of the axle, means yieldingly urging the ends of the band together, an annular member disposed within the drum in sliding engagement with said ring, means upon the annular member for expanding the band when the annular member is moved in one direction, and operating means for moving the annular member.

11. In a brake mechanism, the combination of a wheel and axle, a brake drum connected with the wheel, a support carried by the axle, a brake band within the drum, an annular member within the drum supported for movement longitudinally of the axle and operatively associated with the band, said annular member having portions disposed at an angle to the axis of the wheel, and fluid pressure actuated diaphragms interposed between the support and said portions adapted upon expansion to actuate said annular member whereby to effect application of the brake.

12. In a brake mechanism, the combination of a wheel and axle, a brake drum connected with the wheel, a support carried by the axle, a brake band within the drum, an annular member within the drum supported for movement longitudinally of the axle and operatively associated with the band, said annular member having portions disposed at an angle to the axis of the wheel, fluid pressure actuated diaphragms interposed between the support and said portions adapted upon expansion to actuate said annular member whereby to effect application of the brake, studs extending inwardly from the support, and springs carried by the studs for returning said annular member to release position.

13. In a brake mechanism, the combination of a wheel and axle, a brake drum connected with the wheel, a support carried by the axle, a brake band within the drum, an actuating member mounted within the drum and adapted upon movement in one direction to expand the band into engagement with the drum, said member having a plurality of pockets formed therein, and fluid pressure actuated diaphragms disposed within said pockets and adapted to be held against expansion in one direction by said support and being expansible in the opposite direction to effect movement of said actuating member.

14. In a brake mechanism, the combination of a wheel and axle, a brake drum connected with the wheel, a support carried by the axle, a brake band within the drum, an actuating member mounted within the drum and adapted upon movement in one direction to expand the band into engagement with the drum, said member having a plurality of pockets formed therein, fluid pressure actuated diaphragms disposed within said pockets and adapted to be held against expansion in one direction by said support and being expansible in the opposite direction to effect movement of said actuating member, connecting means adapted to place the diaphragms in communication one with another, a fluid supply connection leading to one of the diaphragms and retractive means for the actuating member.

15. In a brake mechanism, the combination of a wheel and axle, a brake drum connected with the wheel, a support carried by the axle, a brake band disposed within the drum, spring means tending to draw the ends of the band together, means upon the support for preventing circumferential movement of the band within the drum, an actuating member disposed within the drum, a plurality of bearing members secured upon the actuating member and having portions inclined to the axis of the wheel, a series of rollers carried by the band for engagement with the inclined portions of the bearing members, adjusting means for the bearing members, and means for moving the actuating member longitudinally of the axle to and from brake applying position.

16. In a brake mechanism, the combination of a wheel and axle, a brake drum connected with the wheel, a support carried by the axle, a brake band within the drum, an actuating member for the band slidably mounted for movement within the drum longitudinally of the axle, a plurality of fluid pressure actuated diaphragms within the drum, parts carried by said support and said actuating member cooperating to form casings for the diaphragms and connections for supplying fluid under pressure to the diaphragms.

17. In a brake mechanism, the combination of a brake drum, a brake element within the drum, means connected with said brake element for holding it against axial movement within the drum, an annular element mounted within the drum for movement axially thereof, cam means interposed between said annular element and the brake element adapted upon axial movement of said annular element to actuate the brake element and means for actuating said annular element.

18. In a brake mechanism, the combination of a revoluble shaft having a drum thereon, an expansible brake element within the drum movable to engage the inner peripheral face of the drum, an annular element within the said brake element movable axially of the shaft to effect expansion of said brake element, means for holding the brake element against axial movement within the drum and a plurality of operating devices engaging said annular element and adapted to move it axially within the drum to effect expansion of said brake element.

HENRY L. F. TREBERT.